(12) United States Patent
Chang

(10) Patent No.: US 6,980,449 B2
(45) Date of Patent: Dec. 27, 2005

(54) VOLTAGE DETECTING CIRCUIT AND POWER CONVERTER HAVING THE SAME

(75) Inventor: Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/984,134

(22) Filed: Nov. 9, 2004

(65) Prior Publication Data

US 2005/0226014 A1    Oct. 13, 2005

(30) Foreign Application Priority Data

Apr. 8, 2004 (TW) .............................. 93109768 A

(51) Int. Cl.[7] .............................................. H02M 7/02

(52) U.S. Cl. ......................... 363/84; 363/89; 363/126

(58) Field of Search .......................... 363/52, 76, 81, 363/84, 89, 125, 126, 140

(56) References Cited

U.S. PATENT DOCUMENTS

| 4,472,672 A | * | 9/1984 | Pacholok ..................... 320/145 |
| 5,305,192 A | * | 4/1994 | Bonte et al. ............. 363/21.16 |
| 6,049,473 A | * | 4/2000 | Jang et al. ..................... 363/89 |
| 6,115,274 A | * | 9/2000 | Mao ........................... 363/89 |
| 6,549,438 B2 | * | 4/2003 | Malone ........................ 363/89 |

* cited by examiner

Primary Examiner—Gary L Laxton
(74) Attorney, Agent, or Firm—Madson & Metcalf

(57) ABSTRACT

A voltage detecting circuit including an impedance converter, an energy storage element, a current source and a comparing circuit is disclosed. The impedance converter is used for converting a high impedance voltage signal into a low impedance voltage signal. The energy storage element is electrically connected to the impedance converter, and receives the low impedance voltage signal. The current source is electrically connected to the energy storage element, and provides a discharging path of the energy storage element. The comparing circuit is electrically connected to the current source, and receives a voltage signal from the energy storage element. The voltage signal is compared with a predetermined reference voltage value stored in the comparing circuit so as to dynamically control operation of the power converter according to the comparing result.

18 Claims, 6 Drawing Sheets

VOLTAGE DETECTING CIRCUIT AND POWER CONVERTER HAVING THE SAME

FIELD OF THE INVENTION

The present invention relates to a voltage detecting circuit, and more particularly to a voltage detecting circuit for use in a power converter. The present invention also relates to a power converter having such a voltage detecting circuit.

BACKGROUND OF THE INVENTION

With increasing development of technology, computers become essentials of our lives. As common electrical appliances, reliable and stable power is necessary for activating the computers. As known, a power supply apparatus is widely employed to convert an alternating current (AC) from a regular plug into a direct current (DC) to be used by the computer. For a purpose of maintaining desirable performance of the computer, the power supply apparatus should meet with specified requirements and specifications associated with safety, reliability, protection, EMC (electromagnetic compatibility), etc.

Referring to FIG. 1(a), a functional block diagram of a conventional power supply apparatus is shown. The power supply apparatus comprises an AC-to-DC converter 11 and a DC-to-DC converter 12. An input AC voltage Vin received by the AC-to-DC converter 11 is firstly converted into a high DC voltage V, which is then converted by the DC-to-DC converter 12 into a low DC voltage Vout. The low DC voltage Vout is outputted to be used by a load 13 such as an electrical appliance.

FIG. 1(b) is a schematic circuit diagram of the AC-to-DC converter in FIG. 1(a). The AC-to-DC converter 11 comprises a first diode D1, a second diode D2, a bridge rectifier 111, a filter 112, a first resistor R, a second resistor r and a voltage detecting circuit 113.

During normal operation of this power supply apparatus, the input AC voltage Vin should be maintained within a predetermined range, for example from 90 to 130 Volts. The voltage detecting circuit 113 is employed to dynamically detect whether the input AC voltage Vin is acceptable. When the detected AC voltage Vin lies in the acceptable range, the power supply apparatus continuously operates. Whereas, if the detected AC voltage Vin lies outside the acceptable range, a control signal indicative of an insufficient voltage is asserted from the voltage detecting circuit 113. In response to the control signal, the power supply apparatus stops operation.

By means of the bridge rectifier 111 and the filter 112 of the AC-to-DC converter 11, the input AC voltage Vin is converted into the high DC voltage V. When each of the voltages inputted into the diodes D1 and D2 is larger than that of the voltage Vc across the capacitor C, the diodes D1 and D2 are conducted, so that the input AC voltage Vin, as shown in FIG. 1(c), is rectified by the diodes D1 and D2 to produce a DC voltage signal, as shown in FIG. 1(d). Subsequently, the capacitor C is charged via the first resistor R until each of the voltages inputted into the diodes D1 and D2 is less than that of the voltage Vc across the capacitor C. Then, the capacitor C is discharged via the second resistor r until each of the voltages inputted into the diodes D1 and D2 is larger than that of the voltage Vc across the capacitor C. The charging/discharging procedures are continuously performed.

The voltage detecting circuit 113 comprises a comparator 1131 and a voltage source 1132 with a reference voltage Vref, and is employed to dynamically receive the DC voltage Vc of the capacitor. The received DC voltage Vc is compared with the reference voltage Vref of the voltage source 1132 by the comparator 1131. According to the comparing result, a control signal is generated to control the operation of the power supply apparatus.

For a purpose of avoiding immediately asserting the control signal to repeatedly turn on/off the power supply apparatus if the comparing result does not meet the requirement, the comparator 1131 should be rendered to have hysteresis. That is to say, the control signal is not asserted from the comparator 1131 immediately when the comparing result does not meet the requirement, but is asserted when the voltage Vc of the capacitor C is less than the hysteresis voltage Vhy (as shown in FIG. 1(e)) so as to turn off the power supply apparatus.

As known from the circuit of FIG. 1(b), the capacitor C is discharged via the resistor r. Since the RC circuit is discharged in an exponential manner, a higher value of the resistance of the resistor r multiplied by the capacitance of the capacitor C results in a slower discharging rate. As shown in FIG. 1(e), the response time $Tfail_1$ of the RC circuit from the moment when the comparing result does not meet the requirement to the moment when the voltage Vc across the capacitor C is less than the hysteresis voltage Vhy is considerably long. Such a long response time leads to an inferior performance of the power supply apparatus.

Therefore, it is needed to provide a voltage detecting circuit that can solve the drawbacks in the prior art.

SUMMARY OF THE INVENTION

The present invention provides a voltage detecting circuit with an increased response rate so as to enhance the performance of the whole product.

The present invention also provides a power converter having such a voltage detecting circuit.

In accordance with a first aspect of the present invention, there is provided a voltage detecting circuit for use in a power converter. The voltage detecting circuit comprises an impedance converter, an energy storage element, a current source and a comparing circuit. The impedance converter is used for converting a high impedance voltage signal into a low impedance voltage signal. The energy storage element is electrically connected to the impedance converter, and receives the low impedance voltage signal. The current source is electrically connected to the energy storage element, and provides a discharging path of the energy storage element. The comparing circuit is electrically connected to the current source, and receives a voltage signal from the energy storage element. The voltage signal is compared with a predetermined reference voltage value stored in the comparing circuit so as to dynamically control operation of the power converter according to the comparing result.

Preferably, the power converter is an AC-to-DC converter.

Preferably, the impedance converter is a voltage follower including a buffer amplifier.

In an embodiment, each of the high impedance voltage signal and the low impedance voltage signal is a DC voltage signal.

In an embodiment, the voltage detecting circuit further comprises an isolating element electrically connected between the impedance converter and the energy storage element so as to unidirectionally transmit the low impedance voltage signal from the impedance converter to the energy storage element.

Preferably, the energy storage element is a capacitor.

Preferably, the current source is a discharging current source for providing a discharging path of the capacitor.

In an embodiment, the comparing circuit comprises a comparator and a voltage source, wherein the voltage source is stored therein the predetermined reference voltage value.

In an embodiment, the comparator is rendered to have hysteresis.

In accordance with a second aspect of the present invention, there is provided with a power converter. The power converter comprises a rectifying circuit and a voltage detecting circuit. The voltage detecting circuit comprises an impedance converter, an energy storage element, a current source and a comparing circuit. The rectifying circuit is used for rectifying an input AC voltage to a high impedance voltage signal. The impedance converter is used for converting the high impedance voltage signal into a low impedance voltage signal. The energy storage element is electrically connected to the impedance converter, and receives the low impedance voltage signal. The current source is electrically connected to the energy storage element, and provides a discharging path of the energy storage element. The comparing circuit is electrically connected to the current source, and receives a voltage signal from the energy storage element. The voltage signal is compared with a predetermined reference voltage value stored in the comparing circuit so as to dynamically control operation of the power converter according to the comparing result.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2A:
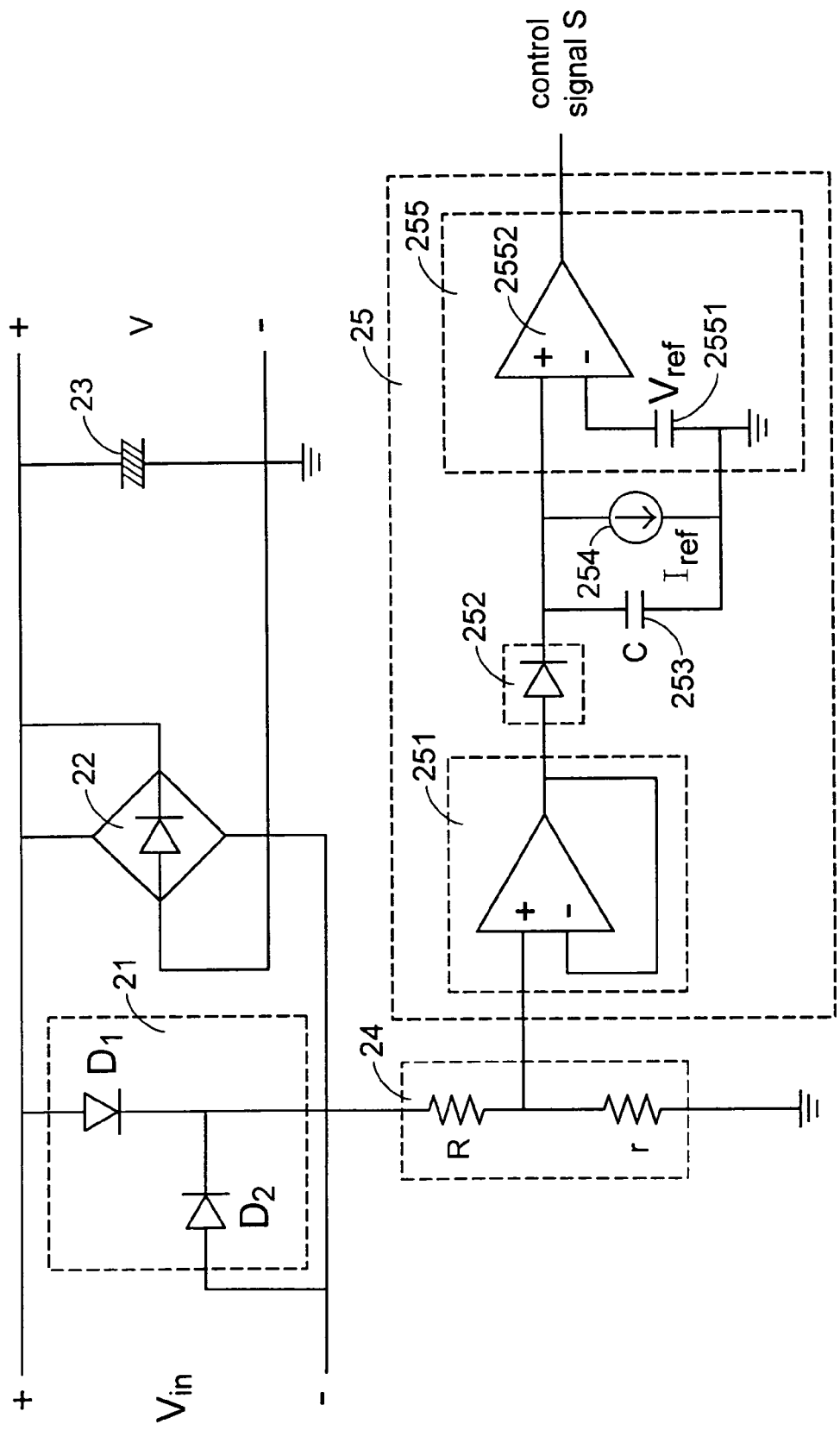
FIG. 2(a) is a circuit diagram of an AC-to-DC converter according to a preferred embodiment of the present invention.

Referring to FIG. 2(a), an AC-to-DC power converter according to a preferred embodiment of the present invention is shown. The AC-to-DC power converter is used for converting an input AC voltage Vin into a high DC voltage V. The AC-to-DC converter comprises a rectifying circuit 21 including a first diode D1 and a second diode D2, a bridge rectifier 22, a filter 23, a voltage divider circuit 24 including a first resistor R and a second resistor r, and a voltage detecting circuit 25.

By means of the bridge rectifier 22 and the filter 23 of the AC-to-DC converter, the input AC voltage Vin is converted into the high DC voltage V.

The voltage detecting circuit 25 is electrically connected to the first resistor R and the second resistor r, and comprises an impedance converter 251, an isolating element 252, an energy storage element 253, a current source 254 and a comparing circuit 255. By means of this voltage detecting circuit 25, the input AC voltage Vin can be dynamically detected. When the detected AC voltage Vin lies in the acceptable range, the power supply apparatus continuously operates. Whereas, if the detected AC voltage Vin lies outside the acceptable range, a control signal indicative of insufficient voltage is asserted from the voltage detecting circuit 25. In response to the control signal, the power supply apparatus stops operation. In which, the energy storage element 253 is a capacitor C, and the current source 254 is a discharging current source.

The impedance converter 251 is a voltage follower including a buffer amplifier. The input AC voltage Vin is rectified by the diodes D1 and D2 and then divided by the resistor R to generate a high impedance voltage signal. Subsequently, the high impedance voltage signal is converted into a low impedance voltage signal by the impedance converter 251.

The isolating element 252, for example a diode, is electrically connected between the impedance converter 251 and the capacitor 253. With this isolating element 252, the low impedance voltage signal is unidirectionally transmitted from the impedance converter 251 to the capacitor 253. In other words, when the capacitor 253 is discharged via the discharging current source 254, the voltage signal will not be transmitted back to the impedance converter 251.

The discharging current source 254 is employed for providing a discharging path of the capacitor 253. When each of the voltages inputted into the diodes D1 and D2 of the rectifying circuit 21 is larger than that of the voltage across the capacitor 253, the diodes D1 and D2 are conducted and the low impedance voltage signal transmitted from the impedance converter 251 will charge the capacitor 253. Whereas, when each of the voltages inputted into the diodes D1 and D2 of the rectifying circuit 21 is less than that of the voltage across the capacitor 253, the capacitor 253 is discharged to the ground via the discharging current source 254.

The comparing circuit 255 comprises a comparator 2552 and a voltage source 2551 with a reference voltage Vref. The voltage Vc across the discharging current source 254 is dynamically received and compared with the reference voltage Vref of the voltage source 2551 by the comparator 255 with hysteresis function. According to the comparing result, a control signal S is generated to control the operation of the power supply apparatus.

If the comparing result lies in the acceptable range, the power supply apparatus starts operation or continuously operates. On the contrary, if the comparing result lies outside the acceptable range, the comparator 255 with a hysteresis function will assert a control signal S showing an insufficient voltage when the voltage Vc across the discharging current source 254 is less than the hysteresis voltage Vhy for avoiding repeatedly turning on/off the power supply apparatus.

Figure 2B:
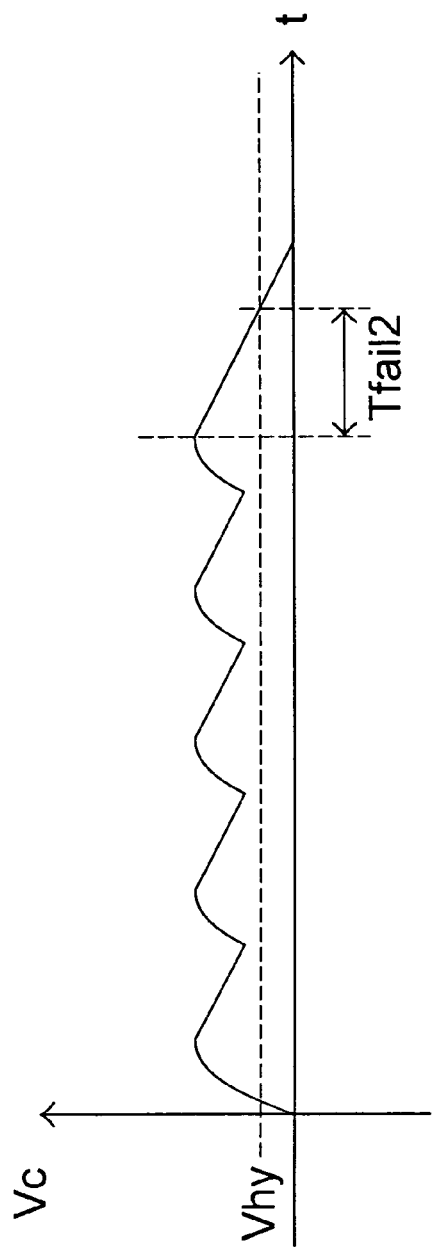
FIG. 2(b) is a timing diagram showing the waveform of the voltage across the current source of FIG. 2(a)

As known, the capacitor 253 is discharged to the current source 254 in a linear manner, as shown in FIG. 2(b). Therefore, the response time from the moment when the comparing result shows an insufficient voltage to the moment when the voltage Vc across the discharging current source 254 is less than the hysteresis voltage Vhy is very short.

Figure 1A:
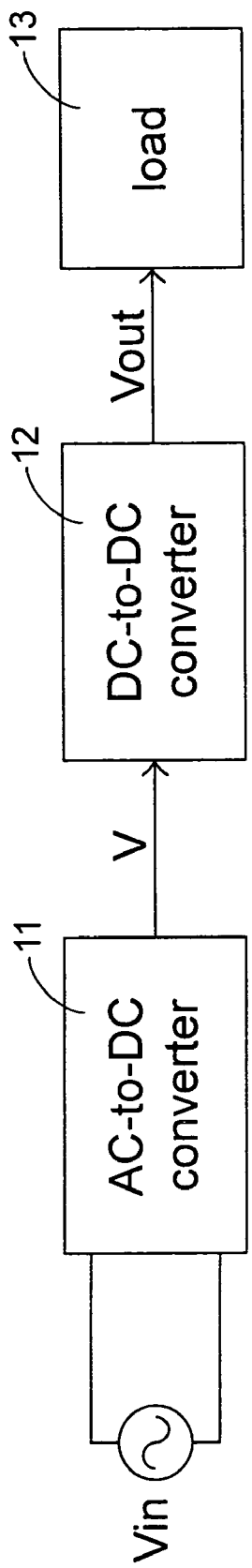
FIG. 1(a) is a functional block diagram of a conventional power supply apparatus.
Figure 1B:
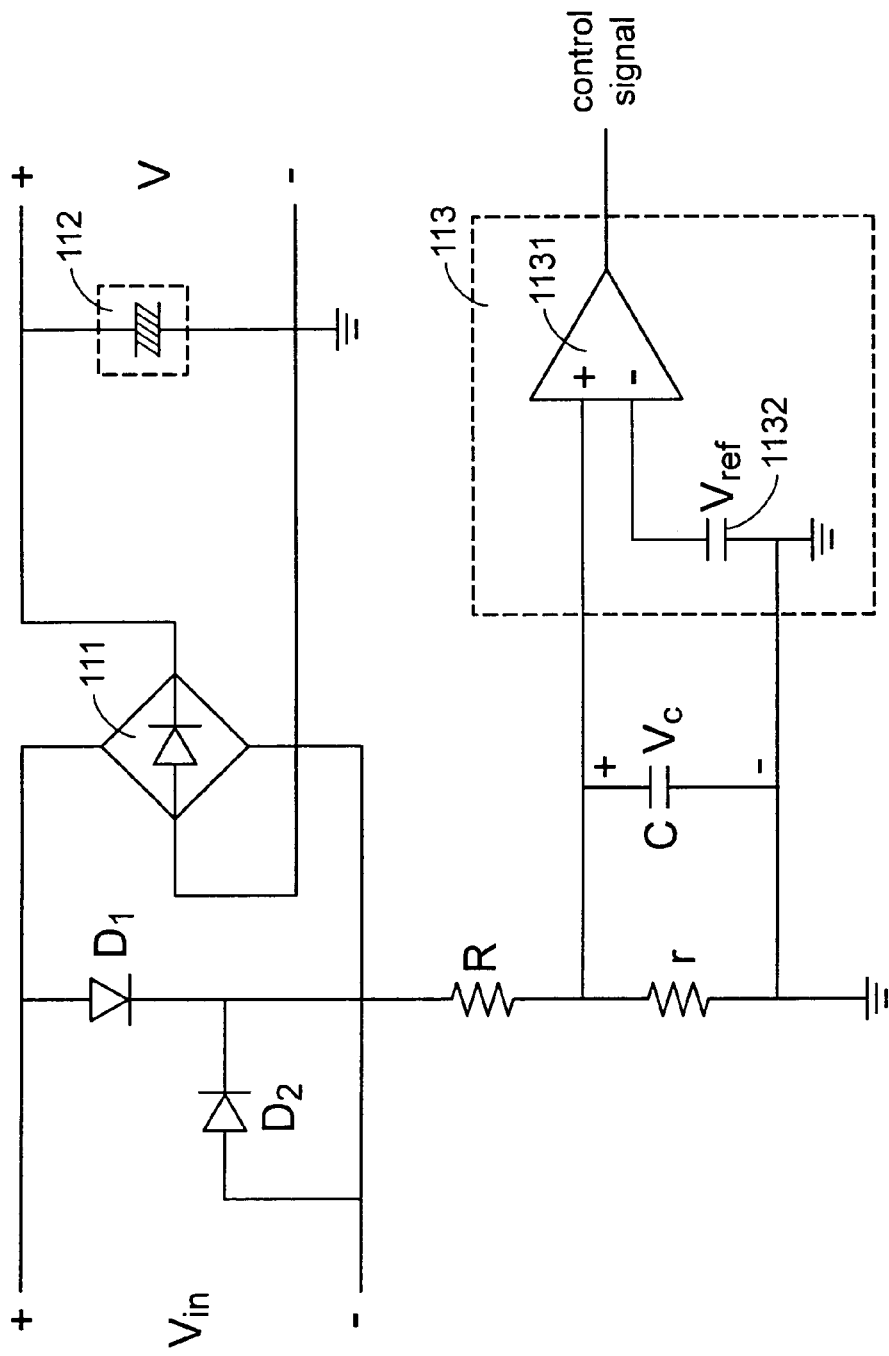
FIG. 1(b) is a circuit diagram of an AC-to-DC converter in FIG. 1(a)
Figure 1C:
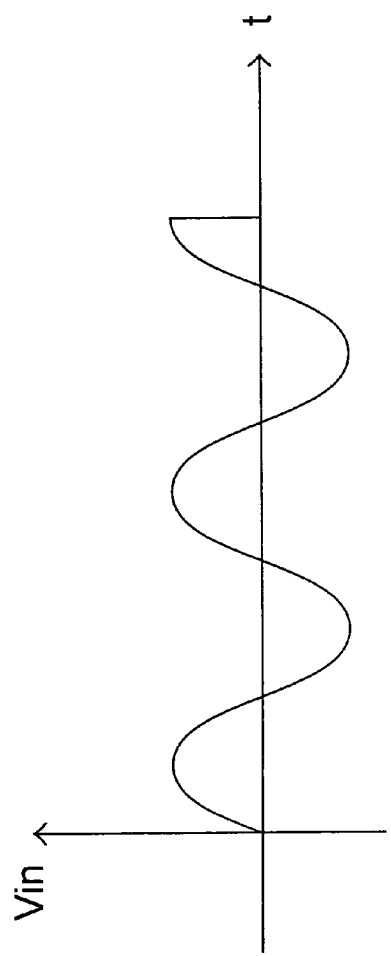
FIG. 1(c) is a timing diagram showing the waveform of an input AC voltage Vin.
Figure 1D:
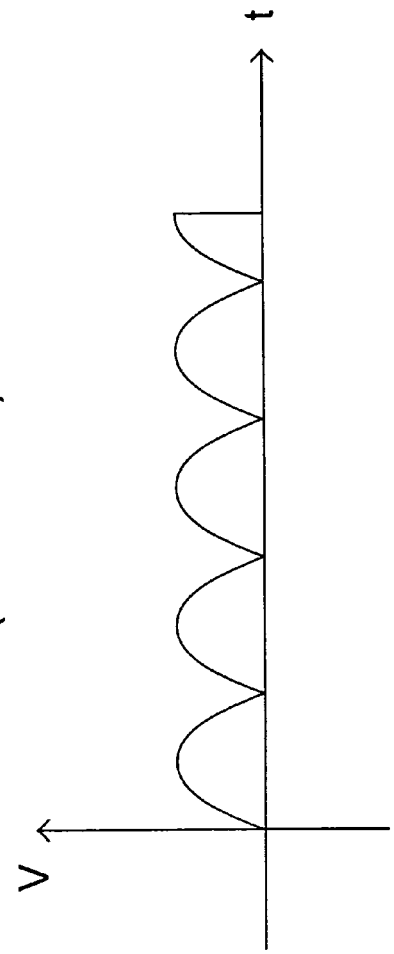
FIG. 1(d) is a timing diagram showing the waveform of a DC signal after the input AC voltage Vin of FIG. 1(c) is rectified.
Figure 1E:
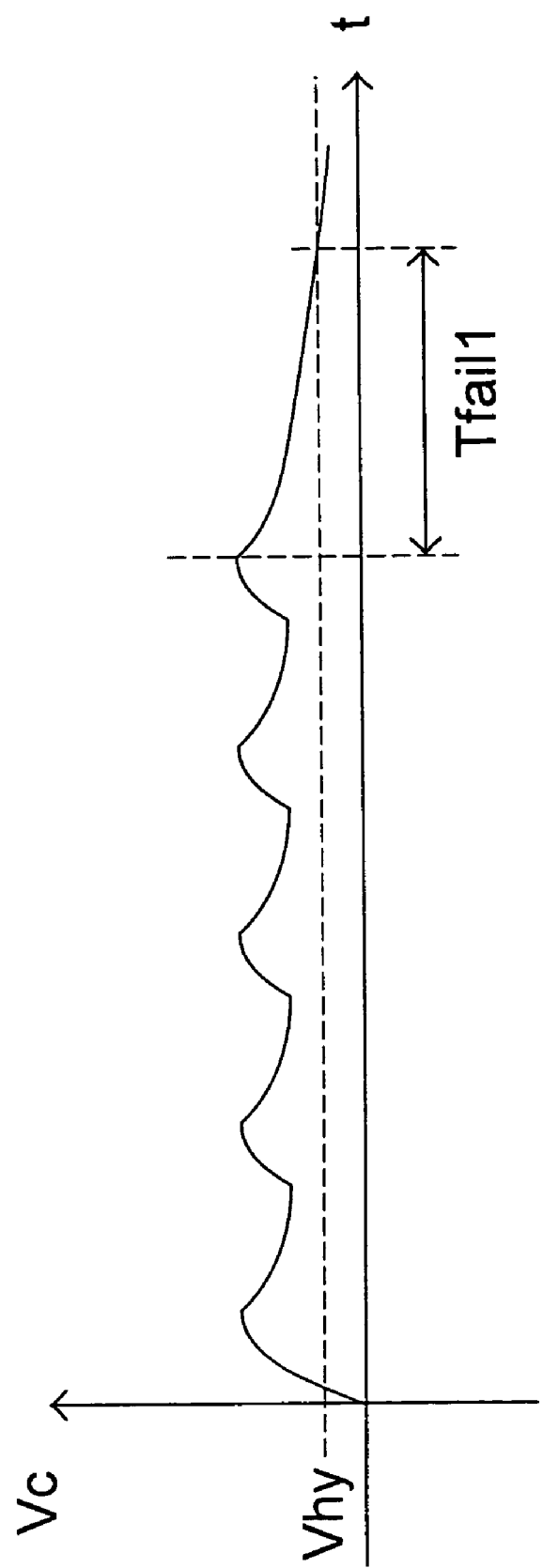
FIG. 1(e) is a timing diagram showing the waveform of the voltage across the capacitor of FIG. 1(b)
Figure 2C:
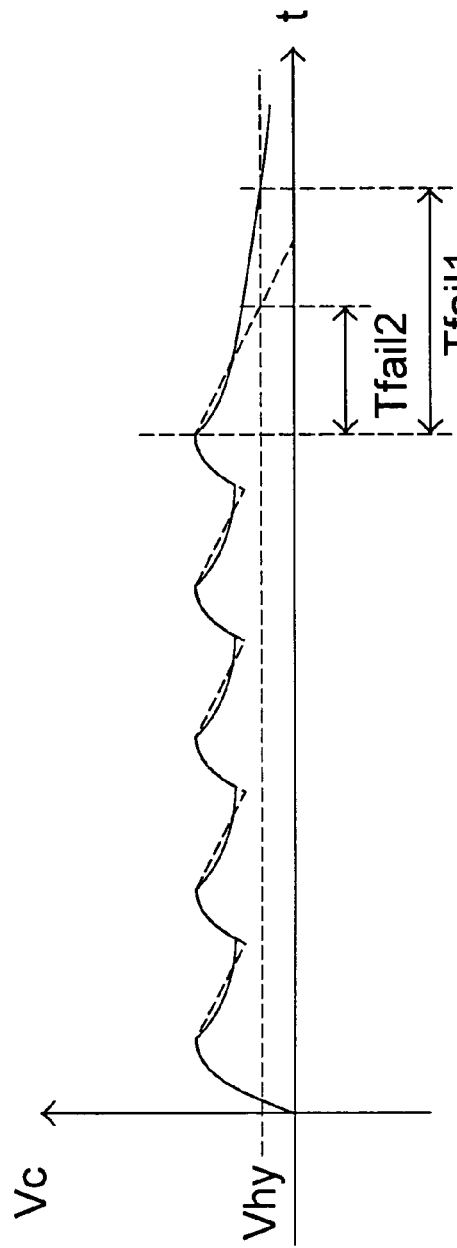
FIG. 2(c) is a timing diagram showing the comparison of voltage waveforms of FIGS. 1(e) and 2(b).

Please refer to FIG. 2(c), which is a timing diagram showing the comparison of voltage waveforms of FIGS. 1(e) and 2(b). When compared with the response time $Tfail_1$ of the RC circuit in FIG. 1(e), the response time $Tfail_2$ of the circuit of the present invention from the moment when the comparing result shows an insufficient voltage to the moment when the voltage Vc across the discharging current source 254 is less than the hysteresis voltage Vhy is much reduced. Such a shorter response time leads to a superior performance of the power supply apparatus.

From the above description, the voltage detecting circuit of the present invention has an increasing response rate so as to enhance the performance of the overall power converter.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage detecting circuit for use in a power converter, said voltage detecting circuit comprising:
   an impedance converter for converting a high impedance voltage signal into a low impedance voltage signal;
   an energy storage element electrically connected to said impedance converter for receiving said low impedance voltage signal;
   a current source electrically connected to said energy storage element for providing a discharging path of said energy storage element; and
   a comparing circuit electrically connected to said current source for receiving a voltage signal from said energy storage element, wherein said voltage signal is compared with a predetermined reference voltage value stored in said comparing circuit so as to dynamically control operation of said power converter according to the comparing result.

2. The voltage detecting circuit according to claim 1 wherein said power converter is an AC-to-DC converter.

3. The voltage detecting circuit according to claim 1 wherein said impedance converter is a voltage follower including a buffer amplifier.

4. The voltage detecting circuit according to claim 1 wherein each of said high impedance voltage signal and said low impedance voltage signal is a DC voltage signal.

5. The voltage detecting circuit according to claim 1 further comprising an isolating element electrically connected between said impedance converter and said energy storage element so as to unidirectionally transmit said low impedance voltage signal from said impedance converter to said energy storage element.

6. The voltage detecting circuit according to claim 1 wherein said energy storage element is a capacitor.

7. The voltage detecting circuit according to claim 6 wherein said current source is a discharging current source for providing a discharging path of said capacitor.

8. The voltage detecting circuit according to claim 1 wherein said comparing circuit comprises a comparator and a voltage source, said voltage source being stored therein said predetermined reference voltage value.

9. The voltage detecting circuit according to claim 1 wherein said comparator is rendered to have hysteresis.

10. A power converter comprising:
    a rectifying circuit for rectifying an input AC voltage to a high impedance voltage signal; and
    a voltage detecting circuit electrically connected to said rectifying circuit, said voltage detecting circuit comprising:
       an impedance converter for converting said high impedance voltage signal into a low impedance voltage signal;
       an energy storage element electrically connected to said impedance converter for receiving said low impedance voltage signal;
       a current source electrically connected to said energy storage element for providing a discharging path of said energy storage element; and
       a comparing circuit electrically connected to said current source for receiving a voltage signal from said energy storage element, wherein said voltage signal is compared with a predetermined reference voltage value stored in said comparing circuit so as to dynamically control operation of said power converter according to the comparing result.

11. The power converter according to claim 10 being an AC-to-DC converter.

12. The power converter according to claim 10 wherein said impedance converter is a voltage follower including a buffer amplifier.

13. The power converter according to claim 10 wherein each of said high impedance voltage signal and said low impedance voltage signal is a DC voltage signal.

14. The power converter according to claim 10, wherein said voltage detecting circuit further comprising an isolating element electrically connected between said impedance converter and said energy storage element so as to unidirectionally transmit said low impedance voltage signal from said impedance converter to said energy storage element.

15. The power converter according to claim 10 wherein said energy storage element is a capacitor.

16. The power converter according to claim 15 wherein said current source is a discharging current source for providing a discharging path of said capacitor.

17. The power converter according to claim 10 wherein said comparing circuit comprises a comparator and a voltage source, said voltage source being stored therein said predetermined reference voltage value.

18. The power converter according to claim 10 wherein said comparator is rendered to have hysteresis.

* * * * *